Jan. 26, 1965 R. H. DOHERTY ETAL 3,167,770

TIME-MULTIPLEX SYSTEM FOR THE DISTRIBUTION OF SERIAL PULSE TIME CODES WITH MICROSECOND SYNCHRONIZATION

Filed Aug. 17, 1961 8 Sheets-Sheet 1

INVENTORS
ROBERT H. DOHERTY
THOMAS L. DAVIS
BY [signature]
ATTORNEY
and
James L. Shannon
AGENT

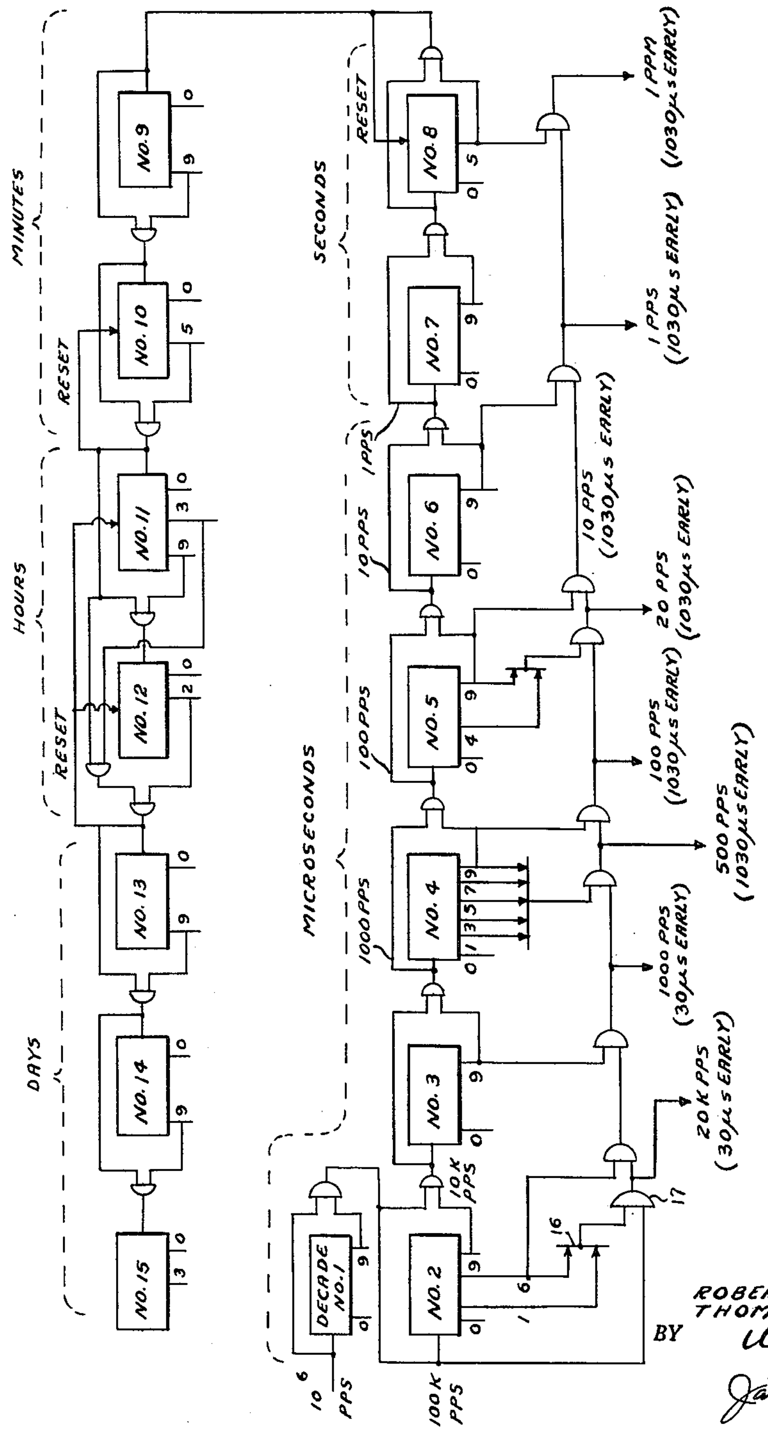
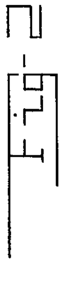
INVENTORS
ROBERT H. DOHERTY
THOMAS L. DAVIS
BY [signature]
ATTORNEY and
[signature]
AGENT TIME-MULTIPLEX SYSTEM FOR THE DISTRIBUTION OF SERIAL PULSE TIME CODES WITH MICROSECOND SYNCHRONIZATION Filed Aug. 17, 1961 8 Sheets-Sheet 3

INVENTORS
ROBERT H. DOHERTY
THOMAS L. DAVIS
BY Wade [signature]
ATTORNEY
and
James S. Shannon
AGENT INVENTORS
ROBERT H. DOHERTY
THOMAS L. DAVIS
BY Wade Koontz
ATTORNEY
and
James S. Shannon
AGENT INVENTORS
ROBERT H. DOHERTY
THOMAS L. DAVIS
BY Wade Koontz
ATTORNEY
James S. Shannon
AGENT INVENTORS
ROBERT H. DOHERTY
THOMAS L. DAVIS
BY Wade Koontz
ATTORNEY
James S. Shannon
AGENT TIME-MULTIPLEX SYSTEM FOR THE DISTRIBUTION OF SERIAL PULSE TIME CODES WITH MICROSECOND SYNCHRONIZATION Filed Aug. 17, 1961 8 Sheets-Sheet 7

INVENTORS
ROBERT H. DOHERTY
THOMAS L. DAVIS
BY Wade Koontz
ATTORNEY
and
James S. Shannon
AGENT Jan. 26, 1965 R. H. DOHERTY ETAL 3,167,770

TIME-MULTIPLEX SYSTEM FOR THE DISTRIBUTION OF SERIAL PULSE TIME CODES WITH MICROSECOND SYNCHRONIZATION

Filed Aug. 17, 1961 8 Sheets-Sheet 8

INVENTORS
ROBERT H. DOHERTY
THOMAS L. DAVIS
BY Wade Koontz
ATTORNEY
James S. Shannon
AGENT United States Patent Office 3,167,770
Patented Jan. 26, 1965

3,167,770

TIME-MULTIPLEX SYSTEM FOR THE DISTRIBUTION OF SERIAL PULSE TIME CODES WITH MICROSECOND SYNCHRONIZATION

Robert H. Doherty and Thomas L. Davis, Boulder, Colo., assignors to the United States of America as represented by the Secretary of the Air Force Filed Aug. 17, 1961, Ser. No. 132,245
5 Claims. (Cl. 343—103)
(Granted under Title 35, U.S. Code (1952), sec. 266)

The invention described herein may be manufactured and used by or for the United States Government for governmental purposes without payment to us of any royalty thereon.

The purpose of this invention is to provide means for distributing a plurality of serial pulse time codes and a plurality of rates with microsecond synchronization to any number of users by means of a one-way transmission over a single channel radio link. Distribution systems of the type described are intended primarily for use in a system for synchronizing a number of widely separated clocks using the Loran-C navigation system and provide the final links between the synchronized clocks and the users.

Describing the distribution system briefly, the sending station has a pulse generator synchronized with a time standard and producing pulses at a standard pulse rate, a clock comprising a cascade of decade counters for counting the pulses of standard rate and a rate generator connected to the clock decades. The rate generator produces sync pulses at a rate much lower than the standard rate and also produces a plurality of serial pulse rate signals of different pulse repetition rates, the highest rate being a submultiple of the sync pulse rate and each remaining rate being a submultiple of the next higher rate. The sync pulses are generated early relative to the pulses of the standard rate by an amount equal to the signal propagation time over the transmission link to the most distant receiving station, and the pulses of the rate signals are generated early relative to the pulses of the standard rate by an amount equal to the propagation time plus the interval between sync pulses. The rate signals are used to produce a plurality of serial pulse time signals the pulses of each of which are coincident with the pulses of one of the rate signals. The sync and time signals are then applied to a multiplexer that produces a multiplex signal in which the pulses of the time signals occur at different instants in the sync interval. The multiplex signal is transmitted over a suitable transmission link to the receiving stations. At each receiving station the sync pulses and the pulses of the time signals are separated from the multiplex signal. The sync pulses are then delayed by an amount equal ot the amount by which they were generated early less the signal propagation time to the receiving station, and the pulses of the time signals are regenerated in synchronism with the delayed sync pulses.

Figure 1:
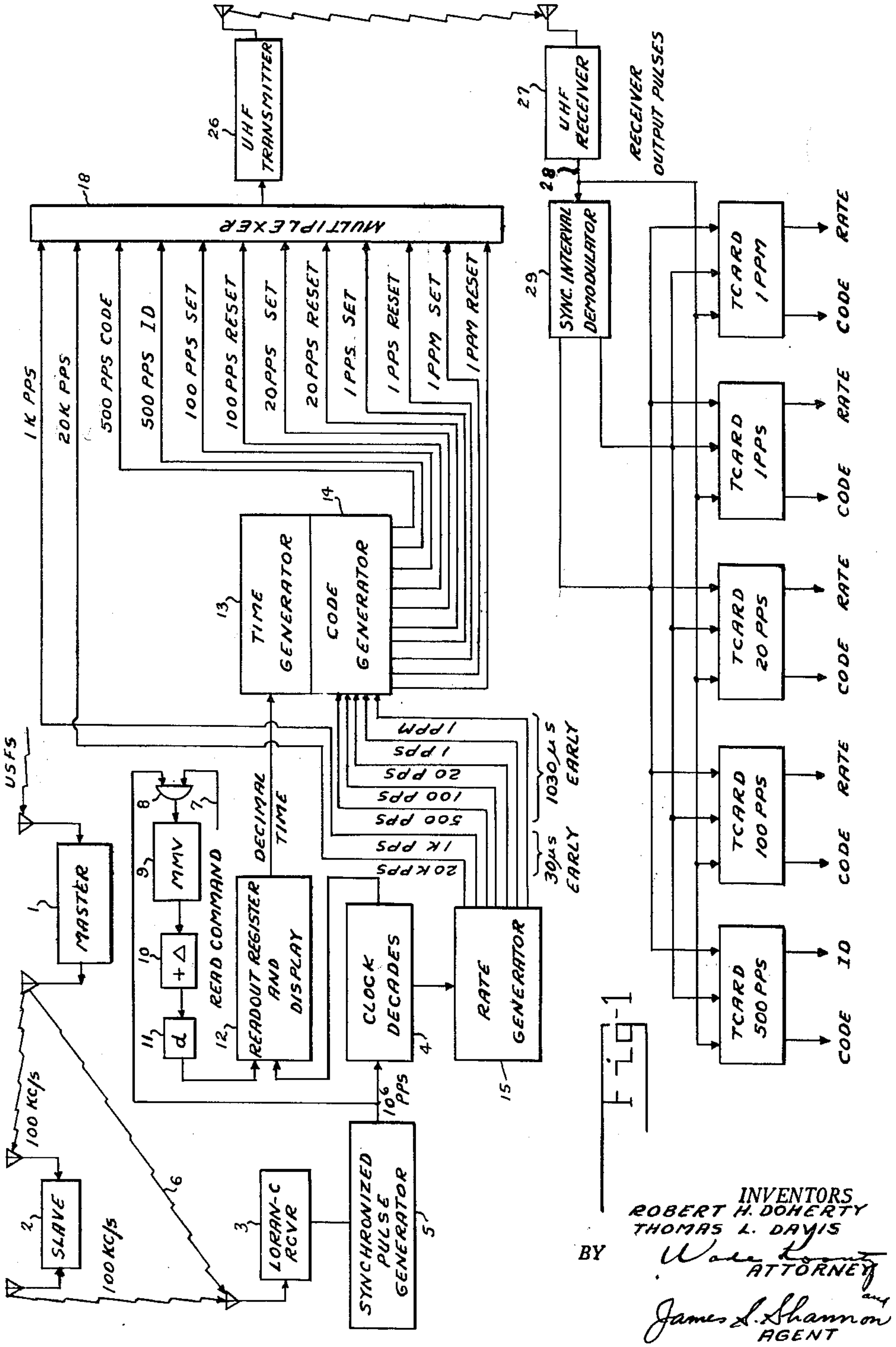
Figure 3:
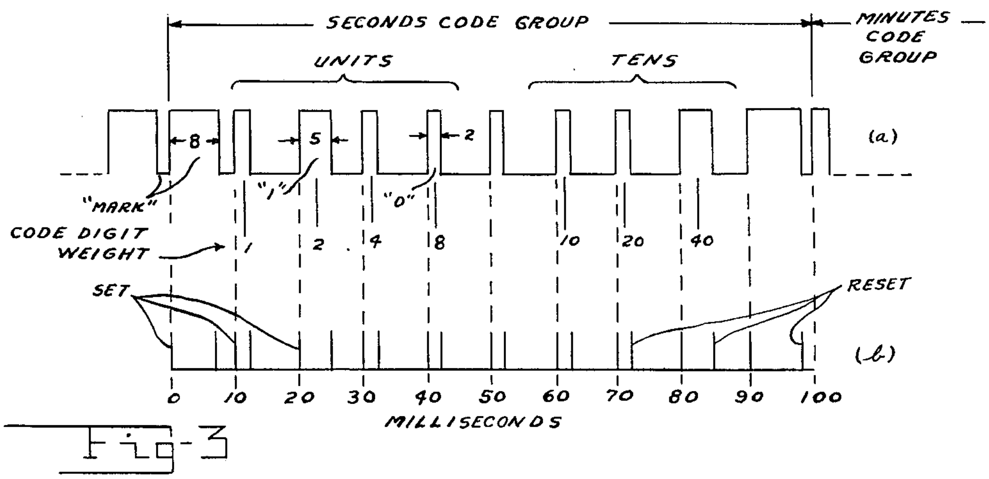
Figure 4:
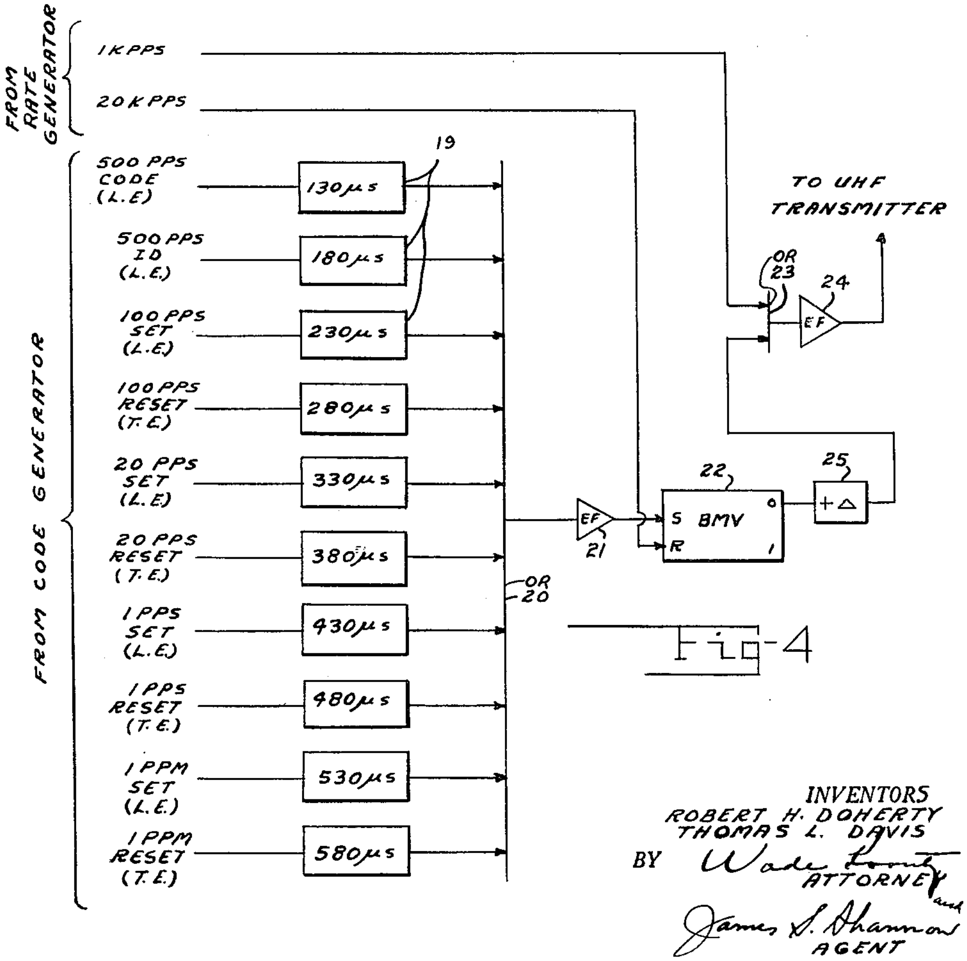
Figure 5:
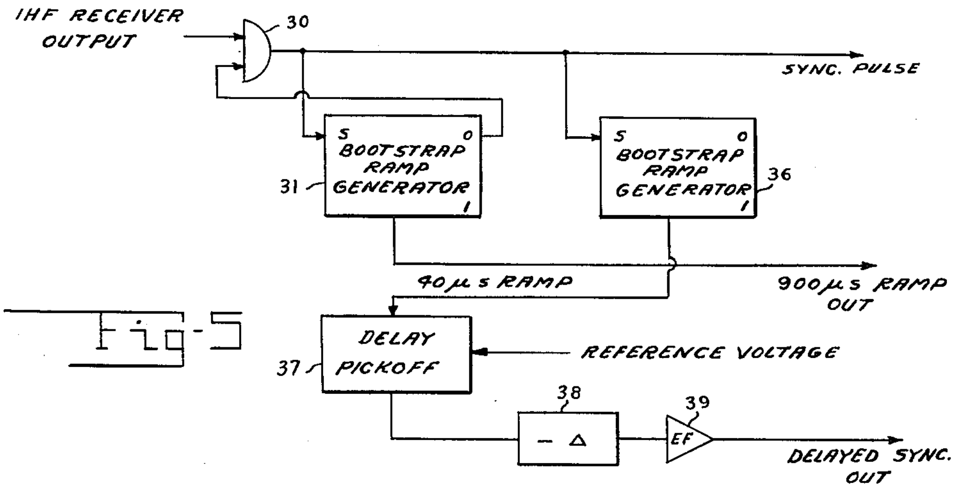
Figure 6:
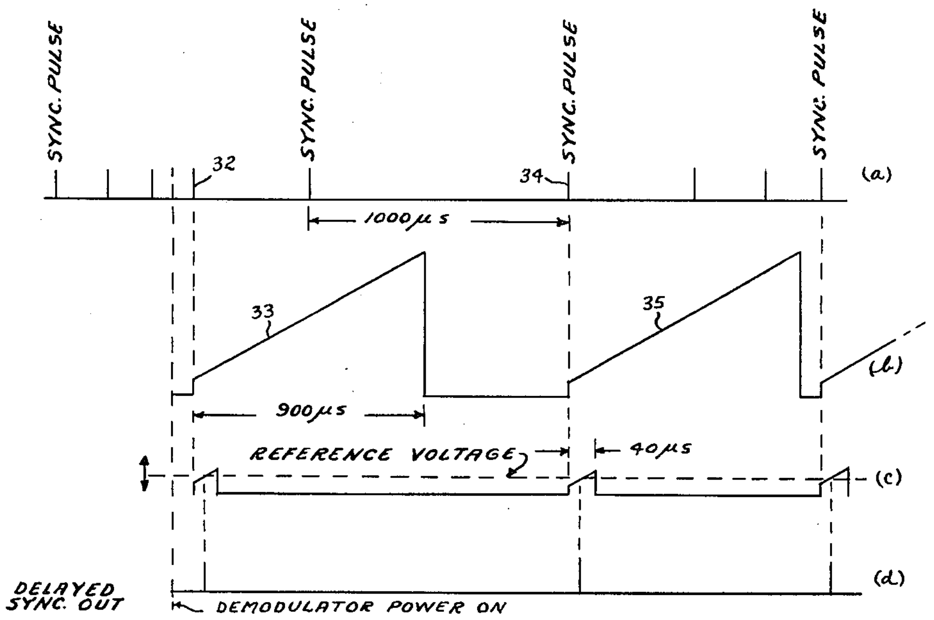
Figure 7:
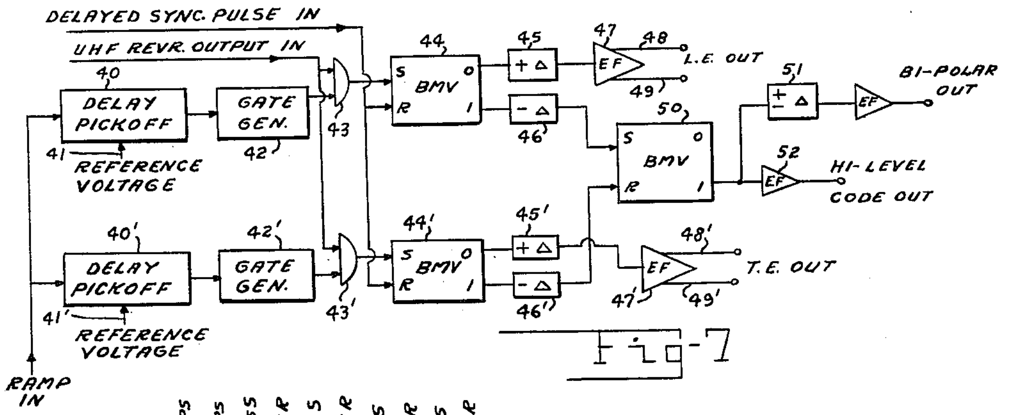
Figure 8:
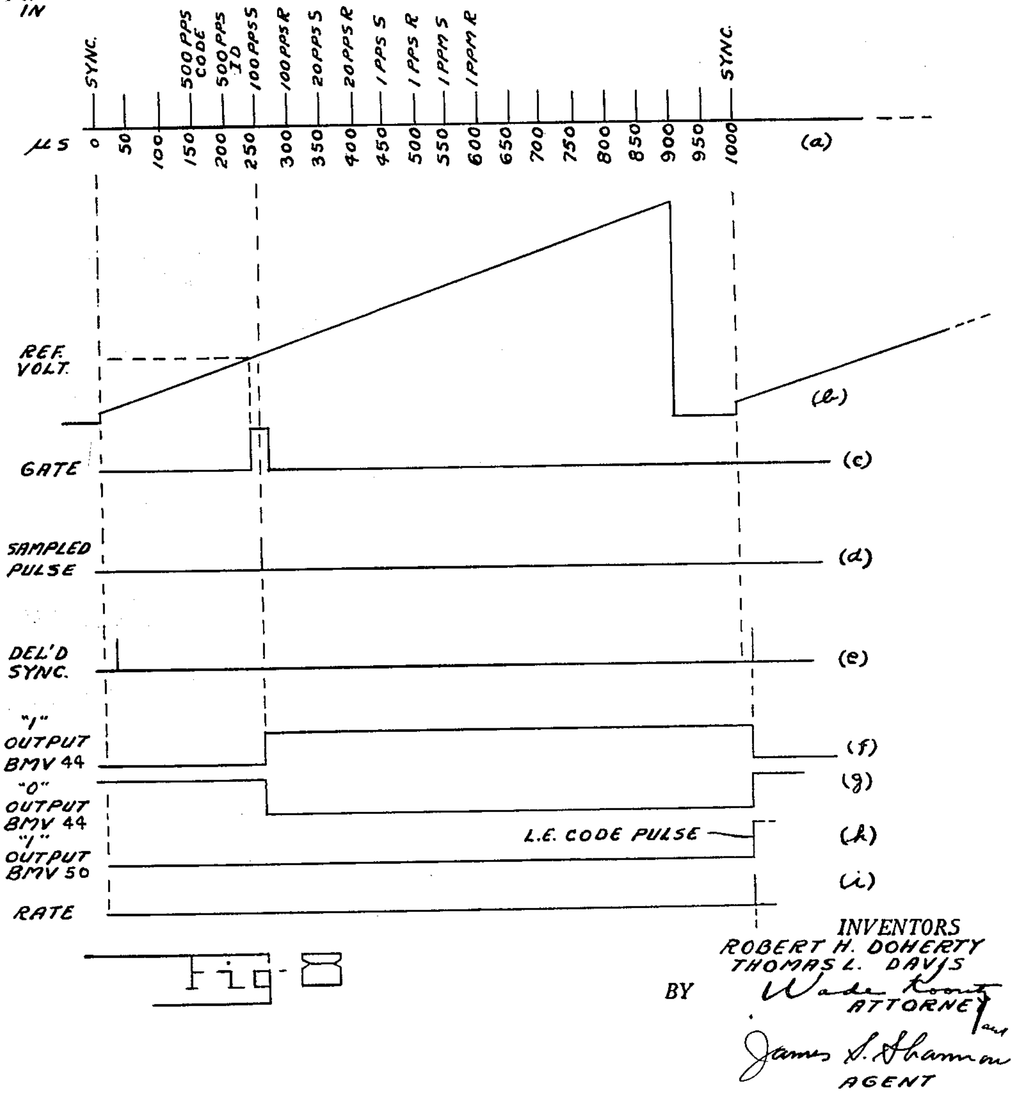
Figure 6:
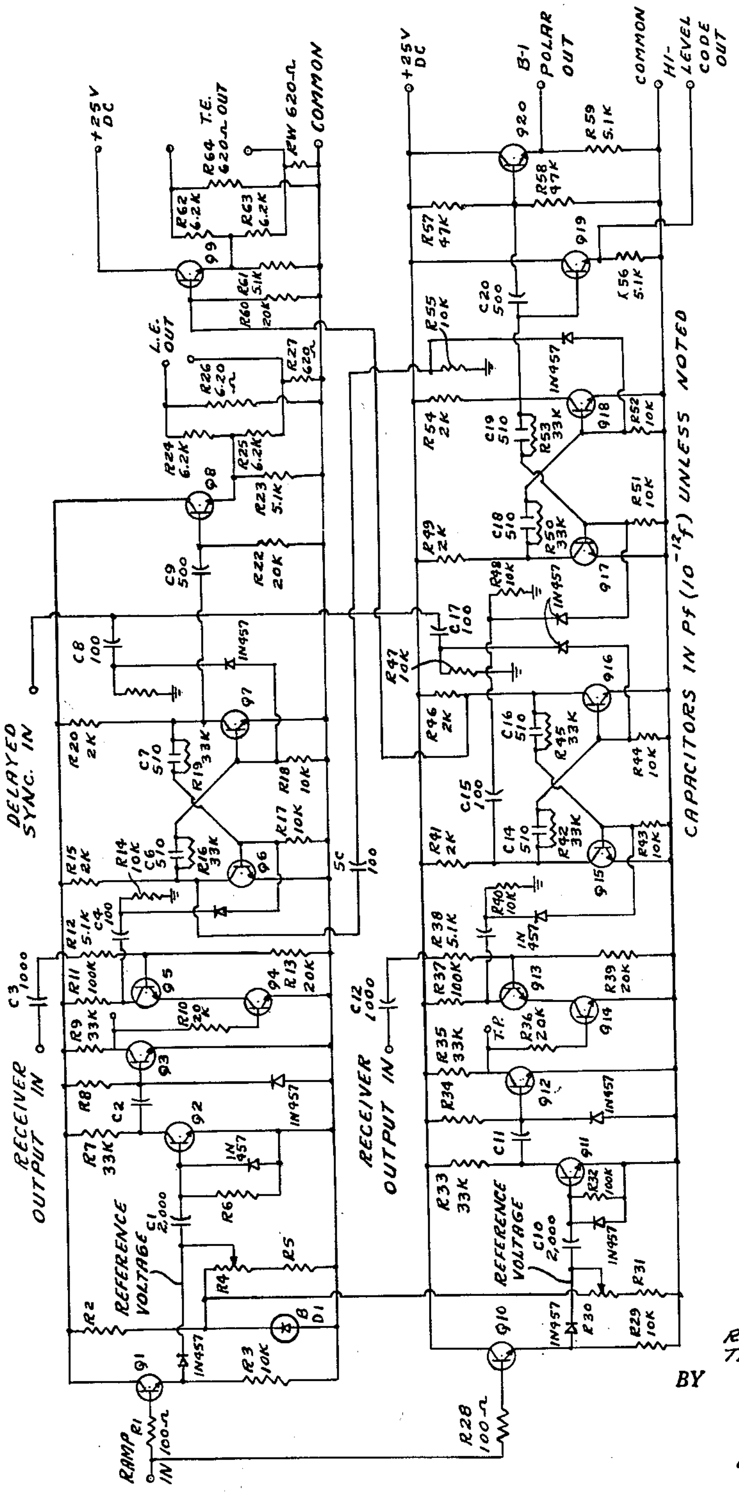
Figure 10:
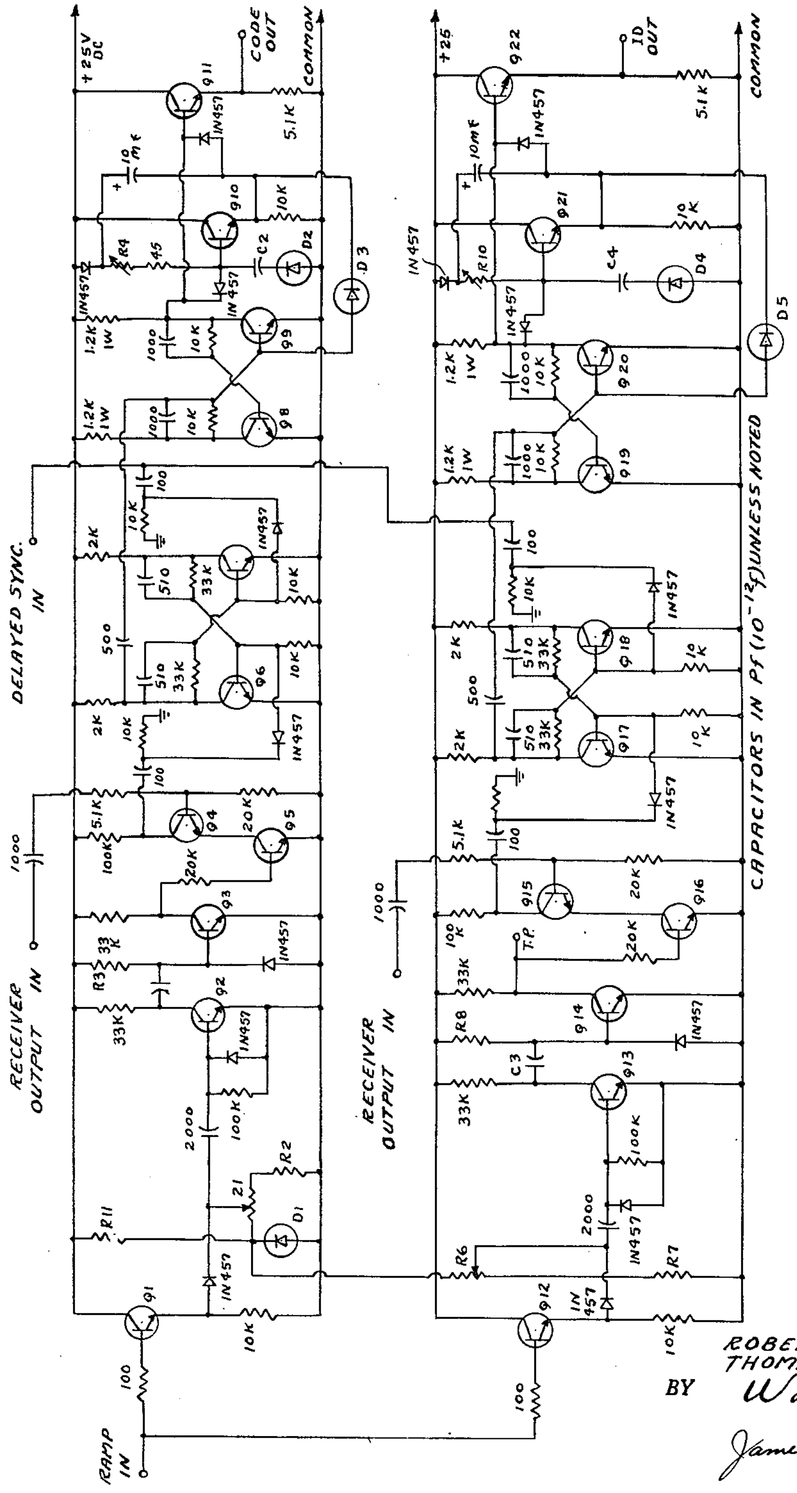
Figure 11:
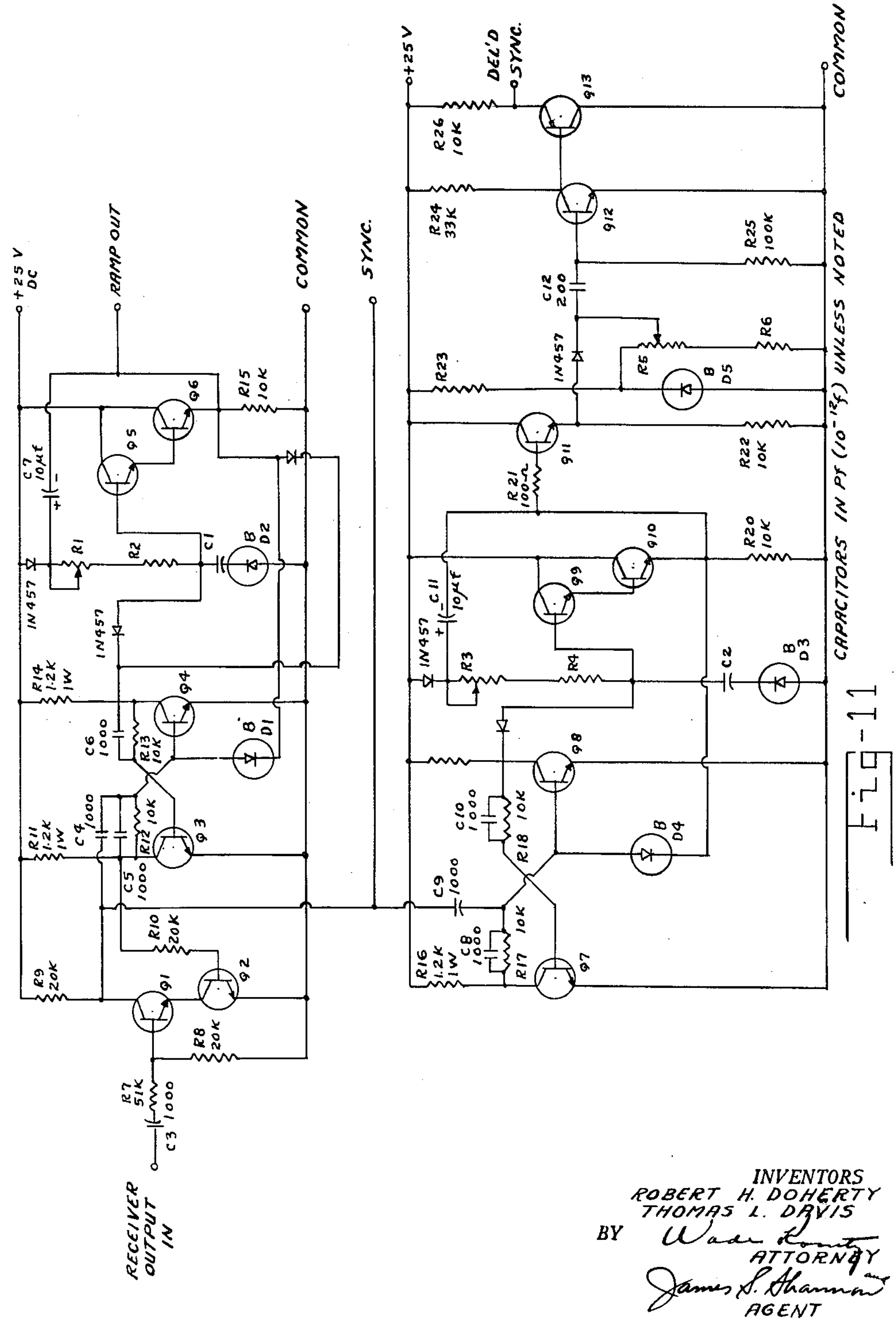

A more detailed description of the invention will be given with reference to the specific embodiment thereof shown in the accompanying drawings, in which:

FIG. 1 is a block diagram of the distribution system showing also its relationship to the Loran-C synchronization system, FIG. 2 is a logical diagram of the synchronized clock and rate generator, FIG. 3 illustrates one of the serial time codes and the method of transmitting pulse information from which the code may be reconstructed at the user's location, FIG. 4 is a block diagram of the multiplexer, FIG. 5 is a block diagram of the synchronization interval demodulator, FIG. 6 illustrates the operation of FIG. 5, FIG. 7 is a block diagram of the time code and rate demodulator, FIG. 8 illustrates the operation of FIG. 7, FIGS. 9 and 10 show detailed circuit diagrams of FIGS. 5 and 7, respectively, and FIG. 11 is a circuit diagram of a demodulator for use with the 500 p.p.s. code.

Referring to FIG. 1, 1 is a master station and 2 a slave station of a Loran-C navigation system. A description of this system, which is a refinement of the basic loran system to increase its accuracy, may be found in the 1957 I.R.E. Convention Record, Part 8, p. 79, "A Precision Multipurpose Radio Navigation System"—W. P. Frantz, W. Dean and R. L. French. The accuracy of the system derives from the use of a gating technique to eliminate the sky wave, the precise synchronization maintained between master and slave transmission, and phase comparison between the master and slave transmissions at the receiver to obtain maximum precision in measuring the time difference of the two receptions. The accuracy of synchronization between master and slave stations is well within microsecond limits, therefore, if the oscillator of the master station is maintained in synchronization with a time signal of the highest accuracy, such as the United States Frequency Standard (USFS), a clock located at any Loran-C receiver and synchronized with the received carrier wave, which in the Loran-C system has a frequency of 100 kc./s., taking into account the propagation time of the ground wave and system delays, can be held within a microsecond of the time standard. Because of the large area covered by the loran system, this method provides a way to establish a large number of accurately synchronized widely separated clocks from which accurate time can be extended to users at various distances from the clock over independent distribution systems of the type to be described.

At any Loran-C receiver 3 the clock 4 counts the pulses produced by a $10^6$ p.p.s. generator 5 which is locked to the carrier of the received signal. This is accomplished by locking the $10^6$ p.p.s. signal to a 100 kc./s. signal locally generated at the receiver and automatically maintained in precise synchronization with the received 100 kc./s. carrier by phase comparison.

The clock 4 is a series of decades which count the pulses produced by synchronized generator 5 for a period of one year, giving, at any instant, the time in days, hours, minutes, seconds and microseconds. This time is made to agree within one microsecond with the time standard by setting the clock ahead by the amount of time required for the signal to travel from the master station 1 to the receiver 3. For synchronization with the directly received master transmission 6, this delay equals the ground wave propagation time from master to receiver plus the receiver delay. For synchronization with the slave signal, this delay equals the ground wave propagation time master to slave, plus the slave station delay, plus the propagation time slave to receiver, plus the receiver delay. Propagation times can be computed within microsecond limits.

The clock may be read at any time by the application of a read-out command pulse over line 7 to one input of AND gate 8 which also has the $10^6$ p.p.s. output of generator 5 applied to the other input. The read command pulse should exceed one microsecond in duration in order to insure that at least one of the synchronized pulses passes gate 8. The first of the synchronized pulses to occur after application of the read command passes the gate 8 and triggers monostable multivibrator (MMV) 9 to produce a rectangular pulse. The MMV is adjusted to produce a pulse of greater duration than the read command pulse in order to insure only one operation of MMV 9 for each read command. The differentiating circuit 10 produces a sharp output pulse from the leading or positive-going edge of the MMV pulse that is coincident with the first synchronized pulse to pass gate 8. After a delay by element 11 of less than a microsecond to insure that the clock decade circuits are in a stable state, this pulse is applied to the readout register and display 12 which stores and displays the clock time at that instant. The stored time, which is in 10-line decimal form as provided by the clock, is supplied to time generator 13.

The clock, along with the rate generator to be explained later, is shown in block form in FIG. 2. It consists of fifteen decades providing time in days, hours, minutes, seconds and microseconds. The seconds, minutes and hours counters reset after counts of 60, 60 and 24, respectively. The days counter counts to 399 and is is reset by hand once a year. Any suitable decade circuits may be used. A satisfactory decade counter is the Burroughs magnetron beam-switching tube BD–309.

The time generator 13 converts 10-line decimal time into binary time. Any or all of the binary forms may be used, such as binary coded decimal (BCD), coded binary (CB) or straight binary (SB). These conversions are accomplished by standard methods well known in the art, such as conversion matrices or registers of bistable elements, which form no part of the invention. The binary time produced by the time generator is in parallel form, i.e., the information bits exist simultaneously.

The code generator 14 utilizes pulse rates obtained from rate generator 15 and time represented in parallel binary form from time generator 13 to produce a plurality of serial binary codes at different pulse repetition rates. In the embodiment shown, five serial codes are produced having rates of 500 p.p.s., 100 p.p.s., 20 p.p.s., 1 p.p.s. and 1 p.p.m. Further, the actual binary code pulses are not represented in the output of the code generator but only set and reset pulses, which are sharp pulses coincident with the leading and trailing edges of the actual code pulses and from which the actual code can be reconstructed at the receiving end of the distribution system.

An inspection of one of the codes will clarify the code format and the manner in which the information is transmitted. FIG. 3(*a*) illustrates the first section of the 100 p.p.s. code. This is in binary coded decimal form, the binary "1" being represented by a pulse of 5 milliseconds duration and the binary "0" by a pulse of 2 milliseconds duration. A "mark" pulse of 8 milliseconds duration is also employed. The smallest time division transmitted by this code is a second, the number of seconds being given by the first code group to be received (42 in the example shown). This is followed in turn by groups giving the number of minutes, hours and days, the transmission of a complete code in this case taking about 0.5 second. The mark pulses are used to indicate the start of the code and the termination of each code group. The set and reset pulses, which coincide with the leading and trailing edges, respectively, of the code pulses in (*a*) and which constitute the actual output of the code generator, are illustrated at (*b*). The 500 p.p.s. code departs from the other codes in that set and reset pulses are not transmitted. This is a presence or absence binary code with only the "1" bits being transmitted. A 500 p.p.s. identification or ID signal is transmitted along with this code.

The codes may be made to resolve time as closely as desired by adding additional code groups. For example, the 100 p.p.s. code may have groups representing 0.1 second, 0.01 second, 0.001 second, etc. added. However, microsecond accuracy is always present in the code in that leading edges and trailing edges of the code pulses, i.e., the set and reset pulses, are synchronized to microsecond accuracy. Further, the rates from which the set and reset pulses are derived are generated early, as will be explained, in order to allow for adjustments for propagation time between the clock and the user, so that the set and reset pulses are accurate in time to within one microsecond when they reach the user.

In the embodiment described, the rates are made 30 μs. early in order to compensate for propagation times up to about 6 miles. Certain of the rates are generated an additional 1000 μs. early, for a total of 1030 μs. early, for a reason which will be apparent later. The construction of the rate generator 15 which produces the required rates is illustrated at the lower edge of FIG. 2. It consists of a number of AND and OR gates associated with decades Nos. 2–8 of the clock in such a way as to gate out the desired rates at the desired earlier times. For example, by connecting the 1 and 6 outputs of decade No. 2 through OR gate 16 to one input of AND gate 17 and the 100K p.p.s. input of decade No. 2 to the other input of AND gate 17, the 100K p.p.s. rate is divided by 5 to produce a 20K p.p.s. rate the pulses of which occur 30 μs. early. An analysis of this circuit will show that the 20K p.p.s. pulses occur in coincidence with the 2nd, 7th, 12th, 17th, etc. pulses of the 100K p.p.s. rate, which is 30 μs. earlier than they would have occurred in a straight division by 5 in which case they would have occurred in coincidence with the 5th, 10th, 15th, 20th, etc. pulses of the 100K p.p.s. rate. In a similar manner, by gating from the decades as required, a 1000 p.p.s. rate 30 μs. early and 500 p.p.s., 100 p.p.s., 20 p.p.s., 1 p.p.s. and 1 p.p.m. rates, all 1030 μs. early, are generated.

The 1030 μs. early rates are applied to the code generator 14 where they are utilized in producing set and reset pulses synchronized with the code rates and coincident with the leading and trailing edges, respectively, of the code pulses, as already mentioned. Standard techniques may be used in the code generator to convert the parallel binary codes into serial form and to generate the synchronized set and reset pulses. The set and reset pulses for the various codes are applied to the multiplexer 18 as shown in FIG. 1. The 1000 p.p.s. and 20K p.p.s. 30 μs. early rates are applied directly from the rate generator to the multiplexer for reasons that will be explained below.

In order to transmit the set and reset pulses for a plurality of codes over a single channel a system of time multiplexing is employed. This system uses a synchronization interval of 1000 μs. with 50 μs. spacing between different pulse signals in the interval, giving a maximum capacity of nineteen signals. In the described embodiment, five serial pulse time codes are to be transmitted. Since each time code requires two signals, a total of ten pulse signals are transmitted. The position of these signals in the sync interval is shown at (*a*) in FIG. 8. This positioning is accomplished by the multiplexer 18, a block diagram of which is shown in FIG. 4. The set and reset pulses (or the code and ID pulses in the case of the 500 p.p.s. code) from the code generator are each applied to one of the delayed trigger generators 19. These may be monostable multivibrators having a differentiating circuit to produce a trigger pulse coincident with the trailing edge of the rectangular pulse produced by the multivibrator. The delay of the trigger with respect to the code generator pulse is indicated in each case. The trigger pulses are applied through OR gate 20 and emitter follower 21 to the set input S of bistable multivibrator (BMV) 22. The BMV has S (set) and R (reset) inputs and 0 and 1 outputs. When the BMV is set there is a + voltage at the 1 output and zero voltage at the 0 output; when the BMV is in the reset state, there is a + voltage at the 0 output and zero voltage at the 1 output. Therefore in going from set to reset and back to set a positive rectangular pulse is generated at the 0 output.

The 1000 p.p.s. rate from the rate generator is the sync pulse of the multiplex system. It is applied through OR gate 23 and emitter follower 24 to the transmitter. The 20K p.p.s. rate from the rate generator is synchronized with the 1000 p.p.s. rate, i.e., a 20K p.p.s. pulse is coincident with each sync pulse. Therefore the 20K p.p.s. rate precisely establishes 19 time positions, 50 μs. apart, within the sync interval. The delays 19 are made different multiples of 50 μs. less about 20 μs. so that the BMV 22 is set about 20 μs. in advance of a 20K p.p.s. pulse. The next 20K p.p.s. pulse then resets BMV 22 generating a positive rectangular pulse at the 0 output which is applied to differentiating circuit 25. The + sign on this circuit indicates that it produces an output pulse coincident with the positive going edge of an applied rectangular pulse but has no output at the negative-going edge. Therefore, the output of circuit 25 is always coincident with a 20K p.p.s. pulse and is therefore accurately positioned within the sync interval. These pulses are applied through OR gate 23 and EF 24 and constitute the accurately synchronized set and reset pulses to be transmitted. The transmitter 26 (FIG. 1) may be of any suitable type, preferably operating in the UHF range.

The information radiated by transmitter 26 may of course be received at any number of using locations. The receiving equipment at a using location is illustrated in block form in the lower part of FIG. 1. UHF receiver 27 receives and demodulates the signal from transmitter 26 so that the signal in its output circuit 28 is a reproduction of the output signal of multiplexer 18. This signal is applied to sync interval demodulator 29, a block diagram of which is shown in FIG 5.

Referring to FIG. 5, the receiver output is applied to one of the two inputs of AND gate 30. Bootstrap ramp generator 31 is a circuit which, when triggered by a pulse at its S input generates a ramp, i.e., a voltage increasing linearly with time. The duration of the ramp is made less than the sync interval but great enough to encompass the information pulses occurring during the interval. In the embodiment shown the ramp extends for 900 μs. after the sync pulse as seen at (*b*) in FIG. 6. Part of the ramp generator is a monostable multivibrator normally in its reset state with an output at its 0 output terminal. Consequently, referring to FIG. 6, the first pulse 32 to occur after the demodulator becomes operative passes gate 30 and sets generator 31 initiating ramp 33 and removing the output voltage from the 0 output. This inhibits gate 30 until the generator automatically resets after 900 μs. The signal rates and format are such that alternate sync intervals are usually vacant. Therefore no pulse occurs between the end of ramp 33 and the next sync pulse 34. Since the inhibition is removed from gate 30 at the end of ramp 33, sync pulse 34 passes this gate and triggers generator 31 to produce ramp 35. In this manner the ramps automatically synchronize with the sync pulses after a short interval.

The pulses which pass gate 30 also trigger ramp generator 36 which is identical to ramp generator 31 except that the ramp duration is only 40 μs., as illustrated at (*c*) in FIG. 6. The 40 μs. ramp is applied to delay pickoff 37 and there compared with an adjustable reference voltage. At the instant the two voltages are equal an output occurs the leading edge of which is differentiated by circuit 38 to produce a sharp pulse which is supplied through emitter follower 39 as a delayed sync pulse. These pulses are illustrated at (*d*) in FIG. 6 and may be delayed relative to the received sync pulses by any amount up to 40 μs. by adjustment of the reference voltage.

The receiver output, the delayed sync pulses and the ramp voltage are applied to five time code and rate demodulators (TCARD), each code having its own demodulator, as shown in FIG. 1. The TCARD used for each of the 100 p.p.s., 20 p.p.s., 1 p.p.s. and 1 p.p.m. codes is shown in block form in FIG. 7. FIG. 8 illustrates the operation of the demodulator in selecting the 100 p.p.s. set pulses. The ramp, indicated at (*b*) is applied to delay pickoff 40 where it is compared with a reference voltage 41. The reference voltage is adjusted to such value as to equal the ramp voltage slightly less than 250 μs. after the sync pulse, for example 15 μs. less, as illustrated in FIG. 8. When the two voltages become equal pickoff circuit 40 produces an output pulse which triggers gate generator 42 to produce a gate pulse, shown at (*c*), of sufficient duration for example 30 μs., to bracket the set pulse which occurs at 250 μs. after the sync pulse. The gate pulse opens AND gate 43 for a sufficient length of time to let the 100 p.p.s. set pulse in the receiver output pass to the S input of BMV 44. The sampled pulse is shown at (*d*) in FIG. 8. This sets BMV 44 producing a negative-going voltage at its 0 output and a positive-going voltage at its 1 output as shown at (*g*) and (*f*) in FIG. 8. Differentiating circuit 45 has no output for a negative-going voltage and differentiating circuit 46 has no output for a positive-going voltage. Therefore, no output occurs from either circuit when BMV 44 is set. BMV 44 remains set until the next occurring delayed sync pulse, shown at (*e*) in FIG. 8, which resets it, producing a positive-going voltage at its 0 output and a negative-going voltage at its 1 output, as shown at (*g*) and (*f*). These voltages result in sharp pulse outputs from differentiating circuits 45 and 46 coincident with the delayed sync pulse. Since the delayed sync pulses are correct in time within one microsecond, as will be seen later, the 100 p.p.s. output of circuits 45 and 46 are equally accurate. The pulses from circuit 45 are made available as 100 p.p.s. rates of microsecond accuracy through emitter follower 47 and output circuits 48 and 49, as shown at (*i*). The output pulses of 46 are used to set code generating BMV 50. This produces a positive-going voltage at its 1 output, as shown at (*h*), which constitutes the leading edge of the code pulse. This leading edge is coincident with the rate pulses in circuits 48 and 49.

The BMV 50 remains set until reset by a reset pulse derived from the received signal in exactly the same manner as the set pulse, using delay pickoff 40′, reference voltage 41′, gate generator 42′, gate 43′, BMV 44′, and differentiating circuit 46′. When BMV 50 is reset a negative-going voltage occurs at the 1 output and constitutes the trailing edge of the code pulse. Since the reset pulse, like the set pulse, is generated in coincidence with the delayed sync pulse, the trailing edge of the code pulse and the 100 p.p.s. rates in circuits 48′ and 49′ have microsecond synchronization. A differentiating circuit 51 produces sharp pulses coincident with both the leading and trailing edges of the code pulse to form a bi-polar output. The code pulses are applied through emitter follower 52 to the code output circuit.

It will be apparent that the set and reset pulses which generate the code pulse do not occur in the same sync interval and that, since they are regenerated at the user location in synchronism with the delayed sync pulse, their relative positions in the sync interval are of no importance. It is also apparent that the code rates (500 p.p.s. and below) were delayed for a portion of the sync interval at the multiplexer (FIG. 4) and for the remainder of the sync interval at the time code and rate demodulator (FIG. 7) as the result of regenerating the rates in synchronism with the delayed sync pulses. There results, therefore, an overall system delay of 1000 μs. which is compensated for by the 1000 μs. portion of the 1030 μs. early generation of these rates by the rate generator 15. As stated before, the purpose of the 30 μs. early generation, which is applied to all rates, is to compensate for the propagation delay between the distributing transmitter and the user location up to a distance of 6 miles. A user at 6 miles receives the signals on time. At distances less than 6 miles the signals are received early by an increasing amount up to 30 μs. at zero distance. This is compensated for by delaying the sync pulses by an equal amount as provided for in the sync interval demodulator (FIG. 5). Since the code pulses and rates are generated at the receiver in synchronism with the delayed sync pulses, they are generated on time at any user location up to, in this case, 6 miles from the transmitter.

Any circuits capable of performing the functions of the time code and rate demodulator of FIG. 7 and the sync interval demodulator of FIG. 5 may be employed. A preferred design for the time code and rate demodulator (FIG. 7) is shown in FIG. 9. Special items for the circuit of FIG. 9 are:

C2, 11—1000 pf., ±1%, TC≦50 p.p.m./C.°
D1—20 v. Zener, ±2.5% (1N721A, etc.)
Q1, 2, 3, 6, 7, 10, 11, 12, 15, 16, 17, 18—2N761(2N337)
Q4, 5, 8, 9, 13, 14, 19, 20—2N756(2N332)
R4, 30—0-50K., ±1%, TC≦50 p.p.m./C.°
R5, 31—5.1K., ±1%, TC≦50 p.p.m./C.°
R8, 34—100K., ±1%, TC≦15 p.p.m./C.°
R2—2K., ±1%, TC≦50 p.p.m. C.°

As stated earlier, the 500 p.p.s. code differs from the other codes in that it is a presence or absence binary code. Instead of using separate set and reset pulses for this code a single pulse technique is used along with monostable multivibrators in the demodulator. A preferred design for the demodulator for this code and the accompanying ID pulses is shown in FIG. 10. Special items for this circuit are:

C1, 3—1000 pf., 5%, TC≦50 p.p.m./C.°
C2, 4—0.01 μf., 5%, TC≦50 p.p.m./C.°
R1, 4, 6, 9—0-50K., 1%, TC≦50 p.p.m./C.°
R2, 7—5.1K., 1%, TC≦50 p.p.m./C.°
R3, 5, 8, 10—100K., 1%, TC≦50 p.p.m./C.°
R11—2K., 1%, TC≦50 p.p.m./C.°
D1, 3, 5—20 v. Zener, 5% (1N721A, etc.)
D2, 4—4 v. Zener, 5% (1N704A, etc.)
Q1, 2, 3, 6, 7, 10, 12, 13, 14, 17, 18, 21—2N337
Q4, 5, 11, 15, 16, 22—2N332
Q8, 9, 19, 20—2N696

A preferred design for the sync interval demodulator of FIG. 5 is shown in FIG. 11. Special items for this circuit are:

C1—10,000 pf., ±1%, TC≦50 p.p.m./C.°
C2—470 pf., ±1%, TC≦50 p.p.m./C.°
R1, 3—0-20K., TC≦50 p.p.m./C.°
R5—0-50K., ±1%, TC≦50 p.p.m./C.°
R6—5.1K., ±1%, TC≦50 p.p.m./C.°
R23—2K., ±1%, TC≦50 p.p.m./C.°
R2, 4—110K., ±1%, TC≦1.5 p.p.m./C.°
D1, 4—20 v. Zener, ±0.5% (1N721, etc.)
D2, 3—4 v. Zener, ±0.5% (1N704, etc.)
D5—20 v. Zener, ±2.5% (1N721A, etc.)
Q1, 2—2N332
Q3, 4, 7, 8—2N696
Q5, 6, 9, 10, 11, 12—2N337
Q13—2N1131

Although the time distribution system described herein in conjunction with the Loran-C synchronizing system is intended primarily for missile range timing, there are many other applications where timing over a large area to microsecond accuracy is required. Some examples of these applications are:

(1) The positioning of high altitude aircraft by means of UHF pulse broadcast from the aircraft received at several locations against a common time base;

(2) the location of thunderstorms by precisely fixing lightning discharges;

(3) the accurate position fixing of nuclear detonations; and (4) the precise measurement of time variations in radio wave propagation studies.

We claim:

1. A time distribution system comprising a sending station having a pulse generator synchronized with a time standard and producing pulses at a standard pulse rate, a plurality of receiving stations at various distances from said sending station and apparatus including a single channel one-way transmission link from said sending station to said receiving stations for generating at each receiving station a plurality of serial pulse signals of different repetition rates all much lower than said standard rate, the pulses of each of which are synchronized within a microsecond with the pulses of said standard rate, said apparatus comprising: a clock comprising a cascade of decade counters at said sending station for counting the pulses of said standard rate; a rate generator connected to said clock decades for generating sync pulses at a rate much lower than said standard rate and a plurality of serial pulse rate signals of different pulse repetition rates, the highest rate being a submultiple of the sync pulse rate and each remaining rate being a submultiple of the next higher rate, said sync pulses being generated early relative to the pulses of said standard rate by an amount equal to the signal propagation time over the transmission link to the most distant receiving station and the pulses of said rate signals being generated early relative to the pulses of said standard rate by an amount equal to said signal propagation time plus the interval between sync pulses; means synchronized with the said signals for producing a plurality of serial pulse time signals the pulses of each of which are coincident with the pulses of one of said rate signals; multiplexing means receiving said time signals and said sync signals for producing a multiplex signal in which the pulses of said time signals occur at different instants in the sync interval; means for applying said multiplex signal to said transmission links for transmission to said receiving stations; and means at each receiving station for separating the sync pulses from said multiplex signal and delaying them by an amount equal to the amount by which they were generated early less the signal propagation time to the receiving station; means for gating the pulses of said time signals from said sync interval; and means for regenerating said gated pulses in synchronism with said delayed sync pulses.

2. Apparatus as claimed in claim 1 in which the pulses of said time signals are set and reset pulses, the set pulses being coincident with the leading edges and the reset pulses being conicident with the trailing edges of the pulses of serial pulse binary time codes, and in which each receiving station is provided with a bistable multivibrator having set and reset stable states and producing a rectangular pulse at its output in going from the reset state to the set state and back to the reset state, and means for setting said multivibrator with the regenerated set pulses and for resetting said multivibrator with the regenerated reset pulses.

3. Apparatus as claimed in claim 1 in which said rate generator also generates a sync interval dividing pulse signal having a rate equal to said sync rate multiplied by an integer greater than the number of said time signals, and in which said multiplexer comprises a delayed trigger generator for each time signal, each having a different delay that is slightly less than a multiple of the interval between the pulses of said sync interval dividing signal, means for applying the pulses of each time signal as trigger pulses to one of said delay trigger generators, a bistable multivibrator having set and reset states and producing a rectangular pulse at its output in going from the reset state to its set state and back to its reset state, means for setting said multivibrator with said delayed trigger pulses, means for resetting said multivibrator with the pulses of said sync interval dividing signal, means for deriving pulses coincident with the trailing edges of the rectangular pulses produced by said multivibrator, and means for combining said sync pulses and said derived pulses to produce said multiplex signal.

4. Apparatus as claimed in claim 3 in which the apparatus at each receiving station comprises means for separating said sync pulses from the multiplex signal and for generating a long ramp voltage and a short ramp voltage each starting in synchronism with said sync pulse, said long ramp having a duration slightly less than the sync interval and said short ramp having a duration not less than the said signal propagation time to the most distant receiving station; a delay pickoff for comparing said short ramp with a reference voltage and means producing a delayed sync pulse when the two voltages are equal; and, for each time signal, a delay pickoff for comparing said long ramp with a reference voltage and producing an output when the two voltages become equal, the reference voltage having a value such that said long ramp becomes equal to it just prior to the position of the time signal in the sync interval, a bistable multivibrator having set and reset states and generating a rectangular pulse at its output in going from reset to set and back to reset, means operative upon occurrence of an output from said delay pickoff to gate said time signal from said multiplex signal to said multivibrator for setting said multivibrator, means for resetting said multivibrator by the next occuring delayed synch pulse, and means for producing a sharp pulse in coincidence with the trailing edge of the rectangular pulse produced by said multivibrator, said pulse constituting the regenerated time signal pulse.

5. Apparatus as claimed in claim 4 in which said time signals are used in pairs to transmit a serial pulse binary time code, the pulses of one time signal serving as set pulses coincident with the leading edges of the code pulses and the pulses of the other serving as reset pulses coincident with the trailing edges of said code pulses, said apparatus comprising in addition, at each receiving station and for each pair of time signals transmitting a pulse code, a bistable multivibrator having set and reset stable states and producing a rectangular pulse at its output in going from set to reset and back to set, means for setting said multivibrator with the regenerated pulses of the time signal providing the set pulses, and means for resetting said multivibrator with the regenerated pulses of the timed signal providing the reset pulses, whereby the pulses of said code are generated as the multivibrator output.

No references cited.

CHESTER L. JUSTUS, *Primary Examiner.*

KATHLEEN H. CLAFFY, *Examiner.*